(12) United States Patent  (10) Patent No.: US 7,384,229 B2
Gleason                    (45) Date of Patent:    Jun. 10, 2008

(54) LOADING DOCK VEHICLE RESTRAINT

(75) Inventor: Denis Gleason, 18 Rebecca Court, Bowmanville, Ontario (CA) L1C 4N7

(73) Assignee: Denis Gleason, Bowmanville (CA)

( * ) Notice: Subject to any disclaimer, the term of this patent is extended or adjusted under 35 U.S.C. 154(b) by 36 days.

(21) Appl. No.: 11/327,986

(22) Filed: Jan. 9, 2006

(65) Prior Publication Data

US 2006/0182559 A1    Aug. 17, 2006

Related U.S. Application Data

(60) Provisional application No. 60/642,426, filed on Jan. 7, 2005.

(51) Int. Cl.
*B65G 67/02* (2006.01)

(52) U.S. Cl. .................................. 414/401

(58) Field of Classification Search ............... 414/401, 414/396, 584
See application file for complete search history.

(56) References Cited

U.S. PATENT DOCUMENTS

| 4,264,259 A | 4/1981 | Hipp | 414/401 |
|---|---|---|---|
| 4,488,325 A | 12/1984 | Bennett | 14/71.3 |
| 4,560,315 A | 12/1985 | Hahn | 414/401 |
| 4,695,216 A * | 9/1987 | Erlandsson | 414/401 |
| 4,861,217 A * | 8/1989 | Erlandsson | 414/401 |
| 4,938,647 A * | 7/1990 | Erlandsson | 414/401 |
| 4,964,777 A | 10/1990 | Kleynjans | 414/401 |
| 4,973,213 A * | 11/1990 | Erlandsson | 414/401 |
| 5,096,359 A | 3/1992 | Alexander | 414/401 |
| 5,297,921 A * | 3/1994 | Springer et al. | 414/401 |
| 5,336,033 A * | 8/1994 | Alexander | 414/401 |
| 5,346,353 A * | 9/1994 | Alexander | 414/401 |
| 7,056,077 B2 * | 6/2006 | Pedersen et al. | 414/401 |

* cited by examiner

*Primary Examiner*—James Keenan
(74) *Attorney, Agent, or Firm*—Jeffrey S. Sokol; Cook & Franke S.C.

(57) ABSTRACT

The present invention relates to a storable vehicle restraint for securing a trailer to a loading dock. A mounting plate anchors a vertical track to the dock. A horizontal barrier is joined to the track and is movable between stored and raised positions. The barrier has a throat that receives the ICC bar of a trailer and a hook that is position in front of the bar to prevent the trailer from moving away from the dock. A cooperating drive unit and lift assembly allows the barrier to be stored at height of 9 inches and raised to a height of 30 inches, while providing a substantially uniform upward force to the barrier. A sensor having a switch to detect proper alignment with the ICC bar is positioned along side the throat of the barrier. The barrier forms a housing that protect the lift assembly, drive unit and sensor switch.

25 Claims, 11 Drawing Sheets

LOADING DOCK VEHICLE RESTRAINT

This application claims priority on Provisional Application No. 60/642,426 filed Jan. 7, 2005.

FIELD OF THE INVENTION

The invention pertains to a vehicle restraint that is particularly suited for securely holding a trailer to a loading dock when loading or unloading the trailer, and which is compactly stored in front of the dock in a protected manner.

BACKGROUND OF THE INVENTION

Vehicle restraints are utilized to increase safety at a loading dock. The restraints secure a truck trailer to the loading dock structure or building when goods are transferred between the trailer and the building. The restraints typically engage a rear horizontal bar referred to as the Rear Impact Guard (RIG) or ICC bar. The ICC bar is located at the rear end of the trailer below the trailer bed. When the trailer is backed up to an available loading dock stall, the ICC bar is positioned close to the face wall of the dock. Bumpers typically extend from the face wall to protect the trailer, dock and any dock leveling fixture at the dock. The restraint helps avoid accidents by securing the trailer to the loading dock so that the truck driver does not inadvertently pull the trailer away when it is being loaded or unloaded. Trailer restraints typically include a hooking device located in front of the dock and anchored to the dock or ground. When in use, the hooking device places a barrier in front of the ICC bar to secure the trailer so that it cannot move away from the dock.

Conventional trailer restraints include storable restraints and impact restraints. Storable restraints move between a raised operating position and a lower stored position. When in the stored position, a trailer should clear the device as it is being backed into an available loading dock stall. Conventional storable restraints are disclosed in U.S. Pat. Nos. 4,488,325, 5,096,359 and 4,964,777. When the trailer and dock leveler are properly positioned with the lip of the leveler resting on the trailer bed, the stored restraint is activated to rise up and securely engage the RIG. Restraint mechanisms of this style are powered into their raised position by motors, springs, or other mechanical means.

Impact restraints include a movable carriage that adjusts to the height of the trailer RIG. The incoming RIG engages a sloped portion of a carriage, which pushes the carriage down and into aligned engagement with the RIG as disclosed in U.S. Pat. Nos. 4,264,259 and 4,560,315. The carriage has a motor that rotates a hook from a release position to a securing or locking position. An operator actuates the motor when the RIG is engaged with and aligned over the carriage. The rotation of the hook causes it to emerge from the carriage and securely engage the RIG.

One problem with storable trailer restraints is their complexity and inefficiency. These problems result from the need for a low stored position, a large range of extension and a uniform upward force to lift the barrier. When in its stored position, the restraint must be low enough to avoid unintended impact or collision with a wide variety of trailers and ICC bars, even when the trailers are heavily loaded and riding low. Given the force of the truck and weight of the trailer, unintended impact by the trailer or ICC bar with the restraint can severely damage the restraint. During operation, the restraint must rise sufficiently high to engage a wide variety of trailers and ICC bars, even when the trailers are empty and riding high. Failing to properly engage the ICC bar can result in serious injury to loading dock workers and even loss of life. For efficiency and safety reasons, the barrier should be raised with a substantially uniform upward force. If the upward lifting force is too small during any portion of the raising movement, the barrier will stall and fail to engage, or fail to stay engaged to the ICC bar. Excessive upward lifting force is inefficient making it difficult for the dock worker to store a manually operated restraint. Conventional designs are overly complex in their attempt to achieve a low stored position and a wide range of vertical barrier movement, while applying a uniform upward force to the barrier. Their bulky designs and heavy weight, which can require lifting the motor itself, are particularly inefficient.

Another problem with conventional loading dock trailer restraints is durability. This problem is of particular concern for impact type restraints. Impact restraints are subject to damage from trailers that are out of square when they are being backed into the docking stall. The trailer and ICC bar can exert tremendous force when they impact the carriage that can twist the entire mechanism. As a result, these restraints are typically bulky, which leads to increased cost of materials and repairs.

A further problem with trailer restraints is their harsh working environment. Storable and impact type restraints are mounted outside on or near the ground where dirt, debris, snow, ice, rain, humidity and temperature all contribute to the wear and tear on the device. The component parts of the restraints deteriorate over time, which causes binding and even the failure of the device. An impact style restraint or a trailer can be damaged when the ICC bar impacts a binding or frozen carriage and attempts to force it down. Solid debris such as rocks, wood or metal can collect beneath an impact type restraint when it is in use, which interferes with the proper movement of the carriage. In addition, attempts to protect moving parts and any sensors via a separate outer housing have been largely unsuccessful. Impact restraints require the hook to extend from the housing, the performance of which can be impaired by the harsh environment.

A still further problem with conventional trailer restraints is false signals that incorrectly indicate the status of the restraint or ICC bar. Binding of sensing component can lead to false signals such as the position of the restraint. Sensing devices near the throat of the hook can also become contaminated or damaged, leading to false signals, such as whether the ICC bar is engaged or disengaged. These false signals can lead to frustration, damage to the restraint or trailer, and serious injury to loading dock workers.

A still further problem with conventional trailer restraints is maintenance. Component parts should be configured to allow easy access and servicing. For example, many storable restraints have guide tracks that turn inwardly to form a central U-shaped compartment for receiving the main guide rollers for the barrier. This compartment collects dirt, debris and ice that is difficult to clean out. The rollers are also difficult to inspect and service. Yet, the contamination of the track and rollers causes increased friction, binding and eventually sustained damage.

A still further problem with conventional trailer restraints is pullout strength. The restraint must be able to prevent a truck from inadvertently pulling a trailer away from the loading dock.

The present invention is intended to solve these and other problems.

SUMMARY OF THE INVENTION

The present invention relates to a storable vehicle restraint for securing a trailer to a loading dock. A mounting plate anchors a vertical track to the loading dock. A horizontal barrier is joined to the track and is movable between stored and raised positions. The barrier has a throat that receives the ICC bar of a trailer and a hook that is positioned in front of the bar to prevent the trailer from moving away from the dock. A cooperating drive unit and lift assembly allows the barrier to be stored at height of 9 inches and raised to a height of 30 inches, while providing a substantially uniform lifting force to the barrier. A sensor having a switch to detect proper alignment with the ICC bar is positioned along side the throat of the barrier. The dual barrier function also forms a housing that protects the lift assembly, drive unit and sensor switch.

In one embodiment of the present loading dock vehicle restraint, the drive unit includes a telescoping hydraulic cylinder, pump and electric motor. The hydraulic cylinder is located below the barrier and joined between a mounting bracket and an upper triangular arm of the lift assembly. The pump and motor are normally located inside the building and connected to the hydraulic cylinder with hydraulic lines. When the drive unit is turned on, the pump provides fluid to the hydraulic cylinder, which extends the lift assembly, and which causes the barrier to rise in the vertical track with a uniform upward force. The barrier rises vertically to its operating position where it engages the RIG and secures it to the loading dock. A pressure switch that senses the pressure of the fluid turns off the pump when the fluid reaches a set pressure level. When the operator selects to release the restraint, the barrier disengages from the RIG and travels down along the guide track to its stored position. The barrier is driven down by its own weight, or the drive unit can pull it down.

In an alternate embodiment, the drive unit is a gas spring that replaces the hydraulic cylinder. The gas spring is located below the barrier and joined between a mounting bracket and an upper triangular arm of the lift assembly. The spring is compressed by manually lowering the barrier to its stored position. A latch holds the barrier assembly in its stored position. When the latch is released, the spring pushes against and extends the lift assembly, which causes the barrier assembly to rise vertically to its operative raised position with a substantially uniform upward force. In each embodiment, the vehicle restraint includes a sensor that indicates when the RIG is securely aligned within the throat of the barrier assembly.

One advantage of the present vehicle restraint is simplicity and efficiency. The cooperating drive unit and lift assembly retracts into a compact configuration inside the barrier when it is in its stored position, and provides a large range of vertical extension by applying a substantially uniform upward lifting force to the barrier. The lift assembly is a two part lever having a lower tension assembly and an upper triangular assembly. The cooperating drive unit and lift assembly retract to a compact nested arrangement with a low profile that allows a wide variety of vehicles to pass over the device. The two part lift assembly also allows the barrier to rise to a height that enables the barrier to securely engage the ICC bar of a wide variety of trailers. The cooperating drive unit and lifting assembly provide a substantially uniform upward force or lifting force for raising the barrier. The simplicity and compact, light weight construction of the barrier, lift assembly and drive cylinder reduces the amount of lifting force needed to raise the barrier. The barrier and the other upwardly movable parts weigh about 50 pounds. When a gas spring cylinder is employed, the net barrier lifting force is about 50 pounds and remains substantially between about 45 and 55 pounds. When a hydraulic cylinder is used, the net barrier lifting force is about 180 pounds and remains substantially between about 160 and 200 pounds. The hydraulically operated restraint also operates more efficiently because its pump and motor are separated from the barrier so that the weight of these components does not have to be factored into the lifting force. Moreover, the pump, motor and controls can be positioned away from the trailer for the safety and convenience of dock workers. These components can be located inside the loading dock building for protection, improved pump and motor performance and life, and reduced and more convenient maintenance.

Another advantage of the present vehicle restraint is its dual function barrier. The barrier has an integral shell structure that securely holds the ICC bar and vehicle to the dock when in its raised operating position. The barrier also forms a protective housing for its internal components when in its lower stored position. The barrier protects the lift assembly, hydraulic cylinder and sensor switch to keep weather, debris and inadvertent impact from damaging them or negatively affecting their performance. The sensor switch is located below the hood of the barrier, and is joined to a sensor mechanism that extends from the side of the barrier. This configuration more effectively protects the switch from damage caused by the weather, debris or direct engagement with the ICC bar. As a result the drive unit, lift assembly and sensor require less maintenance, have increased life and result in fewer signal errors.

A further advantage of the present vehicle restraint is it ability to adjust to the changing height of the RIG when the trailer is being loaded or unloaded. The drive unit includes an accumulator and a dump valve that allows the cylinder to extend and retract so that the barrier can automatically raise and drop with the trailer during loading. Pressure exerted by the trailer and RIG on the barrier is detected by a pressure sensor in sensing communication with the fluid in the hydraulic cylinder. This pressure sensor allows the barrier to engage the RIG with a desired amount of force to ensure that the barrier is properly aligned with the RIG and the trailer is secured to the dock. When the trailer rises during unloading, an accumulator provides additional fluid to the hydraulic cylinder. When the trailer lowers during unloading, an accumulator accepts additional fluid from the hydraulic cylinder. If necessary, the pressure sensor activates the pump motor to further extend the hydraulic cylinder and raise the barrier so that it remains engaged and properly aligned with the RIG.

A still further advantage of the present vehicle restraint is its strength. Both embodiments of the restraint withstand horizontal pullout forces of up to 32,000 lbs. The track is securely and uniformly anchored to the mounting plate along its vertical height, and the mounting plate is securely and uniformly anchored to the face of the loading dock along its vertical height. The track, mounting plate and barrier assembly are robustly designed to maintain their shape under high load conditions that result when a trailer inadvertently pulls away from the dock. The horizontal barrier assembly and its hook shaped barrier transmit the generally horizontal pull out load exerted by the trailer to the vertical track, mounting plate and face wall of the dock without significant torque loads. The drive unit and lift assembly avoid carrying the forces associated with the pull out load. A center reinforcement plate helps maintain the shape of the tracks in the event of a horizontal pull out. When the loading dock is equipped with a dock leveler, the upper end of the mounting plate is welded to an anchored plate along the bottom of the dock leveler pit for added strength, particularly toward its top end where the horizontal pull out load is likely to be applied.

A still further advantage of the present vehicle restraint is its reliability and ease of use. The operator need only turn a control switch on and off, or release and store manually, to control the operation of the device. A first sensor informs the operator if the barrier has not properly engaged the RIG of the trailer. A second sensor informs the operator if the barrier has not returned to its stored position. The construction and configuration of the barrier and lift assembly allow an operator to better view the position of the RIG relative to the barrier assembly, particularly when it is in the throat of the barrier. Guide rollers prevent the barrier from binding with the vertical track as it moves up or down along its path of travel.

A still further advantage of the present vehicle restraint is its ease of maintenance. The vertical tracks face outward to prevent debris from easily collecting and to improve access for ease of maintenance. The track and main rollers are open to the outside for ease of cleaning and maintenance. An easily removable top cap allows for the entire barrier to be removed from the track.

Other aspects and advantages of the invention will become apparent upon making reference to the specification, claims and drawings.

DESCRIPTION OF THE PREFERRED EMBODIMENTS

While this invention is susceptible of embodiments in many different forms, the drawings show and the specification describes in two preferred embodiments of the invention. It should be understood that the drawings and specification are to be considered an exemplification of the principles of the invention. They are not intended to limit the broad aspects of the invention to the embodiments illustrated.

Figure 1:
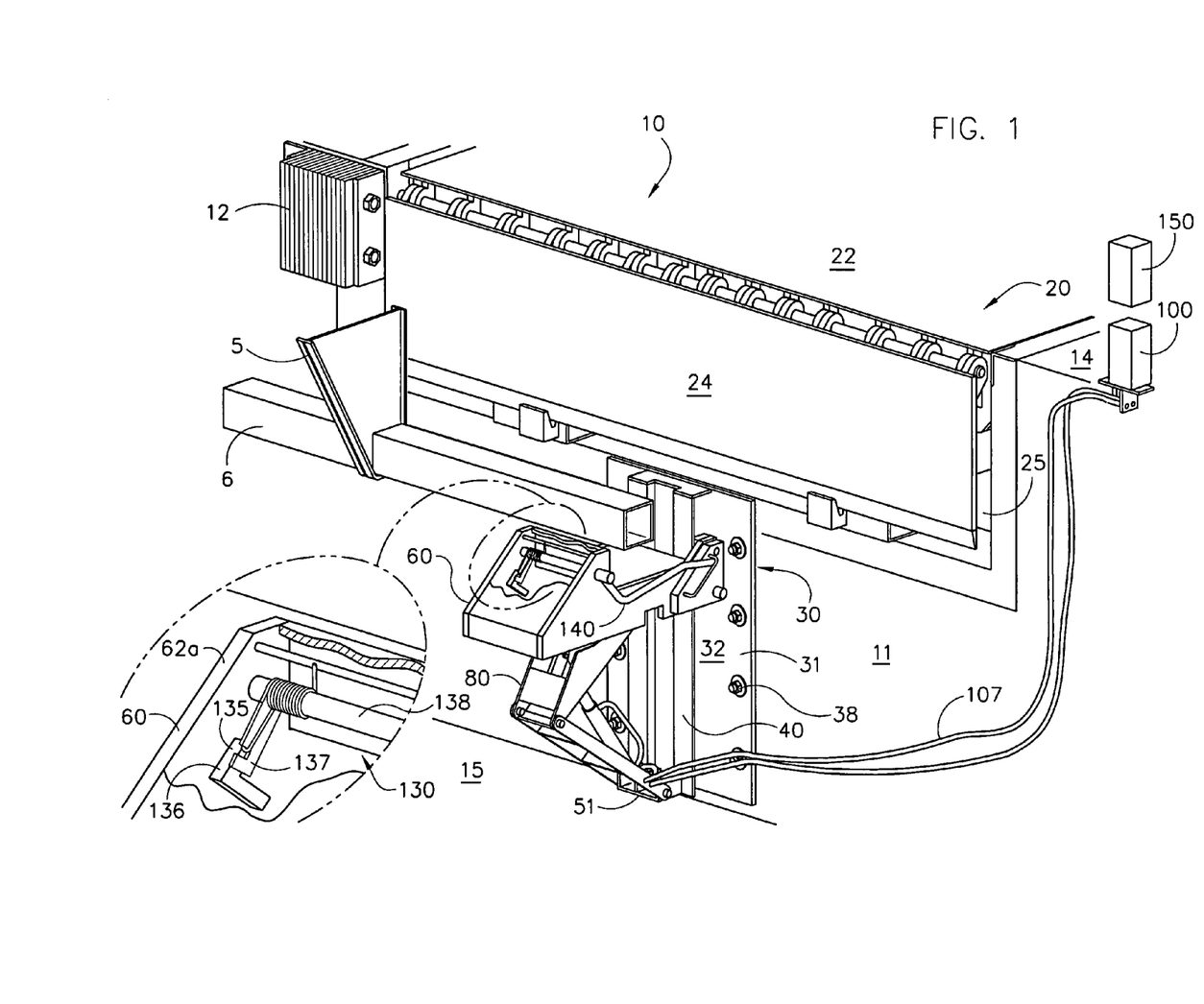
FIG. 1 is a perspective, partial cut-away view of the vehicle restraint secured to a loading dock in its operative raised position just prior to its barrier engaging the ICC bar of a trailer, and an enlarged view showing its sensing contact closed.

Conventional truck trailers 5 have a rear impact guard (RIG) or ICC bar 6 used to facilitate loading and unloading the vehicle. The elongated bar 6 typically parallel to and spans the width of the rear end of trailer 5. The bar 6 has a square or rectangular cross-sectional shape with four-sides as shown in FIG. 1. The bar 6 has a lower or downward facing surface 7 that is generally normal to its forward facing or front surface 8. When the trailer 5 is backed into a loading dock 10, the rear end of the trailer is generally parallel to and moves toward the face or front wall 11 of the dock. The vertical face 11 of the dock 10 typically has one or more bumpers 12 to help prevent inadvertent damage to the dock or trailer. The bumpers 12 have a front surface that spaces the trailer 5 a few inches from the front wall 11 of the dock 10. The horizontal upper surface 14 of the dock 10 is elevated above the ground surface or roadway 15 so that the bed of the trailer 5 is generally level with the upper surface of the dock. A dock leveler 20 is frequently provided to accommodate any difference in height between the bed of the trailer 5 and the upper surface 14 of the dock 10. The dock leveler 20 has a deck 22 that is hingably secured to be even with the upper surface 14 of the dock 10. An extendable lip 24 is hingably secured to the front of the deck 22. A lift mechanism (non shown) in a pit 25 of the dock 10 moves the deck 22 and lip 24 between stored and operating positions. When in the operating position, the deck 22 and lip 24 form a ramp between the bed of the trailer 5 and the upper surface 14 of dock 10.

Figure 2:
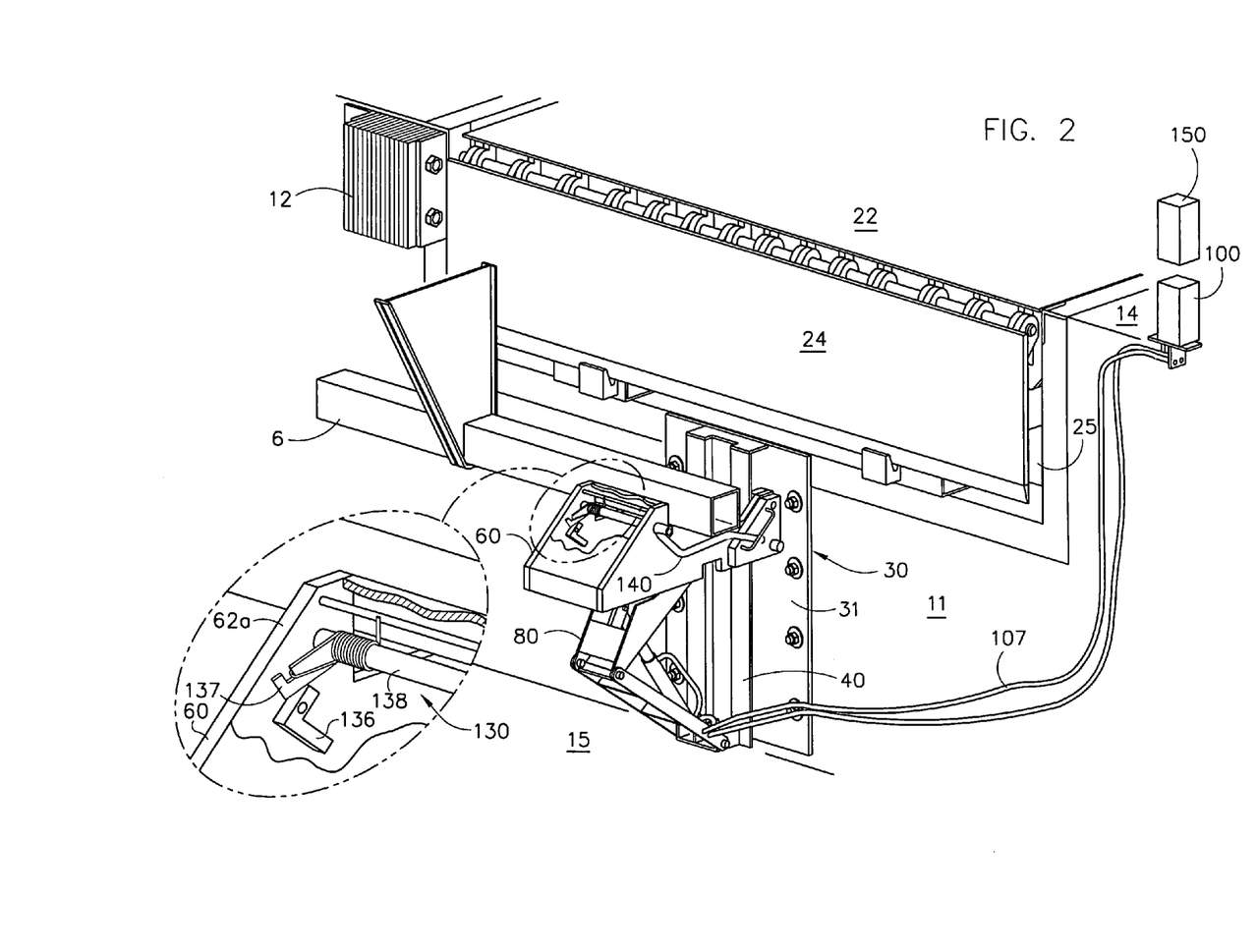
FIG. 2 is a perspective, partial cut away view of the vehicle restraint in its operative raised position with its barrier engaging the ICC bar of a trailer, and an enlarged view showing its sensing contact open
Figure 3:
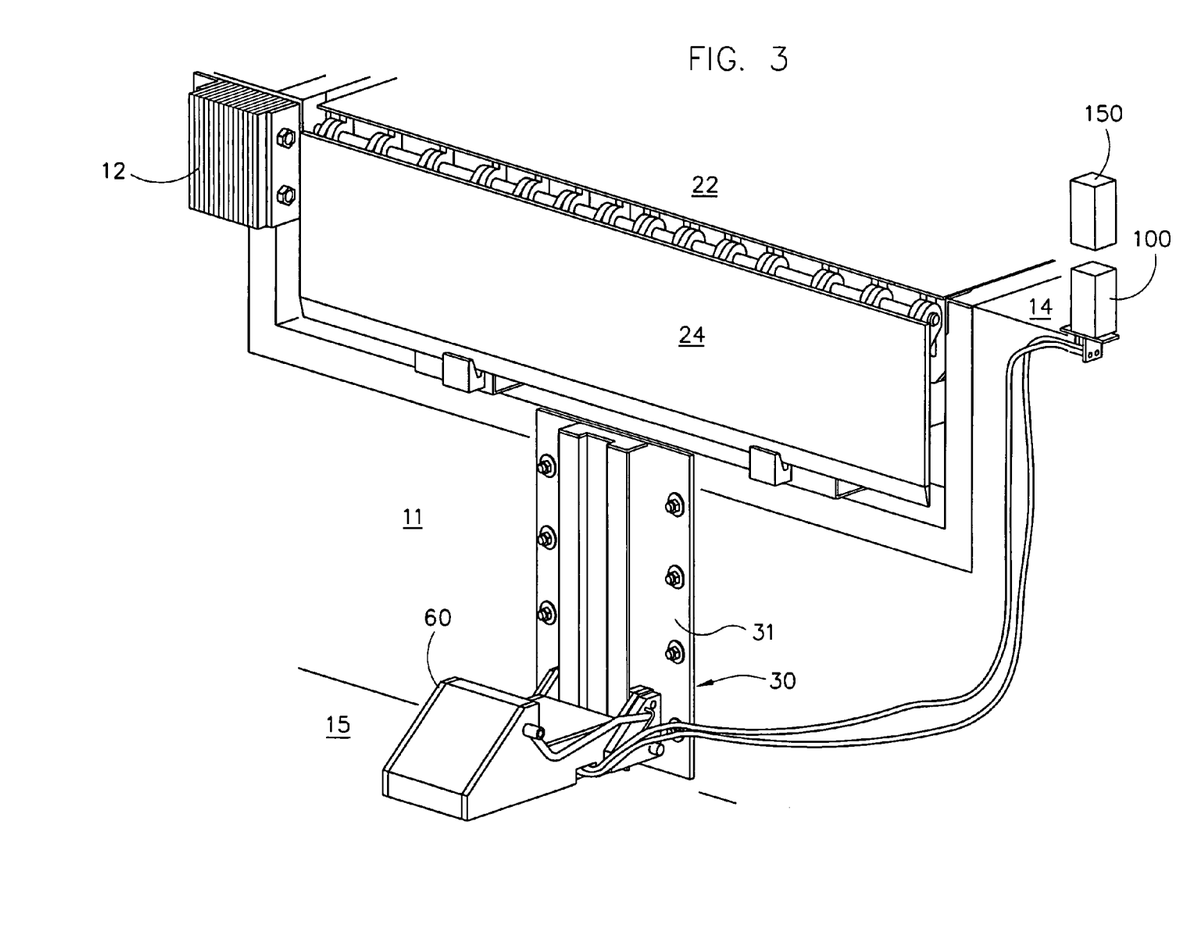
FIG. 3 is a perspective, partial cut-away view of the vehicle restraint in its stored position with its barrier forming a housing that protects the lift and sensor assemblies.

The present invention generally relates to a loading dock trailer restraint that is generally shown as reference number 30 in FIGS. 1-3. The trailer restraint 30 is provided for installation as a prefabricated, pre-welded and generally preassembled device or apparatus. The restraint 30 is designed for a loading dock 10 with or without a dock leveler 20. The trailer restraint 30 is located directly in front of the dock stall and below any dock leveler 20. The restraint 30 is preferably centered in front of the leveler between any spaced apart bumpers 12. The restraint 30 and its components are robustly designed to withstand a simulated trailer pull-out force of about 100,000 lbs. Various components are made of steel, and are welded together for increased strength. The steel components are zinc plated for high corrosion resistance.

The trailer restraint 30 includes a rear mounting plate 31 anchored to the front wall 11 of the loading dock 10. The mounting plate 31 is made of steel and has a uniform thickness of about ⅜ of an inch. The plate 31 has a flat front and rear surface 32 and 33. The rear surface 33 of the plate 31 flushly engages the front wall 11 of the dock 10 so that its front surface 32 is vertically orientated and parallel to the front of the dock. The plate 31 has a generally rectangular shape with top, bottom and side edges 34-36. The plate 31 is about 28 inches tall and 18 inches wide. The bottom edge 35 is spaced a slight distance from the ground 15 to prevent the ground from pushing against the plate 31 due to thermal expansion in summer or shifting due to frost in winter. The top edge 34 extends to a height about even with or just above a lower front edge of the pit 25 that houses the dock leveler 20. The top edge 34 is sized to not interfere with the movement of the lip 25 of the dock leveler 20. The plate 31 is anchored to the front 11 of the dock 10 by a number of uniformly spaced fasteners 38 located proximal its side edges 36. The fasteners 38 are preferably concrete expansion anchors or concrete wedge anchors. The top edge 34 is preferably welded to a pit curb angle located along the front edge of the pit. Alternatively, the plate 31 can be welded to an embedded, steel, dock face plate (not shown). Although not shown, the mounting plate 31 can include a vertical portion that extends into the pit, which is welded to the pit angle.

Figure 8:
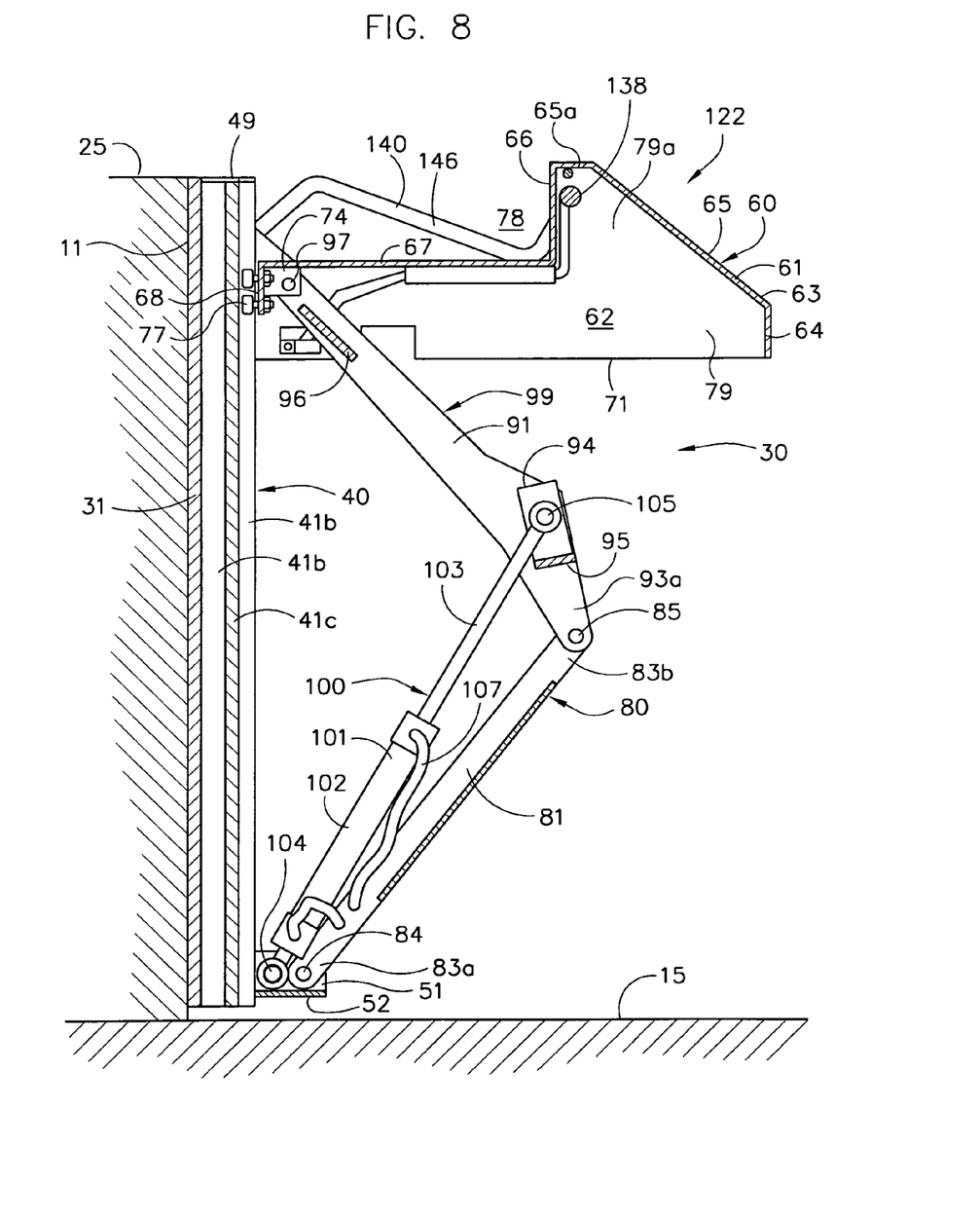
FIG. 8 is a side sectional view of FIG. 6 taken along line 8-8 showing the barrier and lift assemblies in their raised position and its sensor biased to its closed position.

A track 40 is welded or otherwise anchored to the mounting plate 31. The track 40 includes two opposed steel angles 41 having a uniform thickness of about ½ inch. When viewed from above, each angle 41 has a 90° bend that defines an outward extending leg 41a and a rearward extending leg 41b. The bent angles 41 provide structural strength and form dual vertical, sideward extending tracks 42 and 43. The legs 41a and tracks 42 and 43 are generally vertically aligned with and parallel to the mounting plate 31. The rear end of each leg 41b is welded or otherwise anchored to the mounting plate 31. The angles 41 are joined by a central stiffening plate 41c that further strengthens the track 40. As best shown in FIG. 8, plate 41c is spaced forward from mounting plate 31.

Each track 42 and 43 has front and rear surfaces 44 and 45. The rear surface 45 of each track 42 and 43 is spaced from the front surface 32 of the mounting plate 31a desired uniform distance roughly equal to the depth of the leg 41b. Each track 42 and 43 has a vertical outer edge 46. The width of the track 40 between its edges 46 is about 8 inches. The track 40 has a central channel located between the legs 41b of the opposed angles 41 and forward of the stiffening plate 41c. The width of this central channel is about 4 inches. The top and bottom edges 47 and 48 of the track 40 are generally flush with the top and bottom edges 34 and 35 of the mounting plate 31, so that the track 40 has a total height of about 28 inches. A steel cap 49 is welded or otherwise rigidly secured to the tops 34 and 47 of the track 40 and mounting plate 31, respectively. The cap 49 extends from one outside edge 46 of the track 40 to the other. The cap 49 closes the top of the track 40 and is bolted in place.

A mounting channel or bracket 51 is welded or otherwise rigidly secured to the lower end 48 of the track 40. The mounting channel 51 is made of steel and formed by a horizontal plate 52 and a number of vertical flanges 54-56. The mounting channel 51 is narrower than the width of the track 40. Outer flange 54 is positioned toward the middle of track 42, and outer flange 55 is positioned toward the middle of track 43. A middle flanges 56 is located near the middle of the central panel 41c. The rear end of each vertical flange 54-56 is welded to the front surface 44 of the track 40. The bottom of the plate 52 is flush with the bottom edges 35 and 48 of the mounting plate 31 and track 40, respectively so that each is spaced a slight distance from the ground 15. The mounting plate 31, track 40 and channel 51 are welded together into an integral component part.

Figure 4:
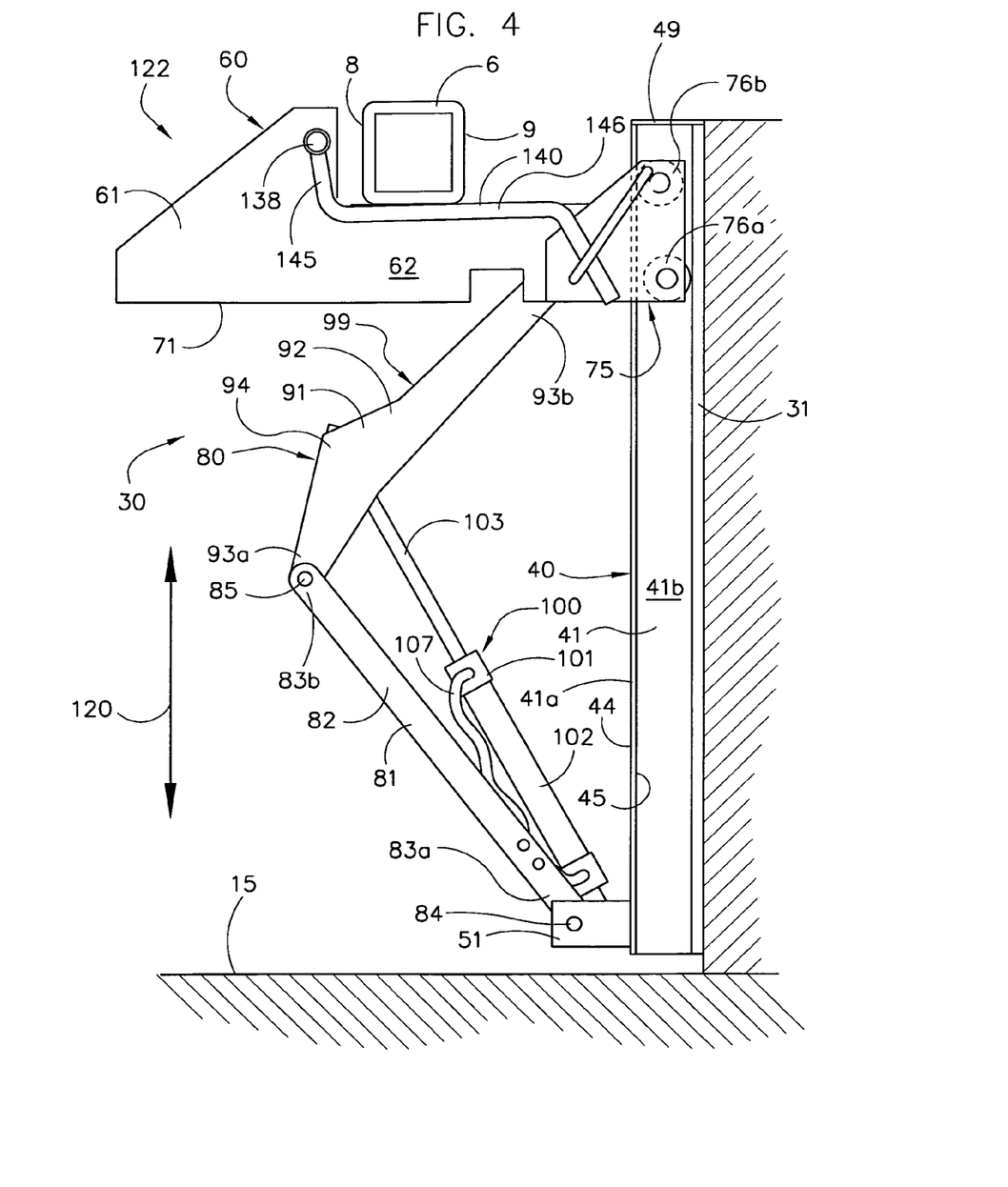
FIG. 4 is a side sectional view of FIG. 2 showing the vehicle restraint in its raised position.
Figure 5:
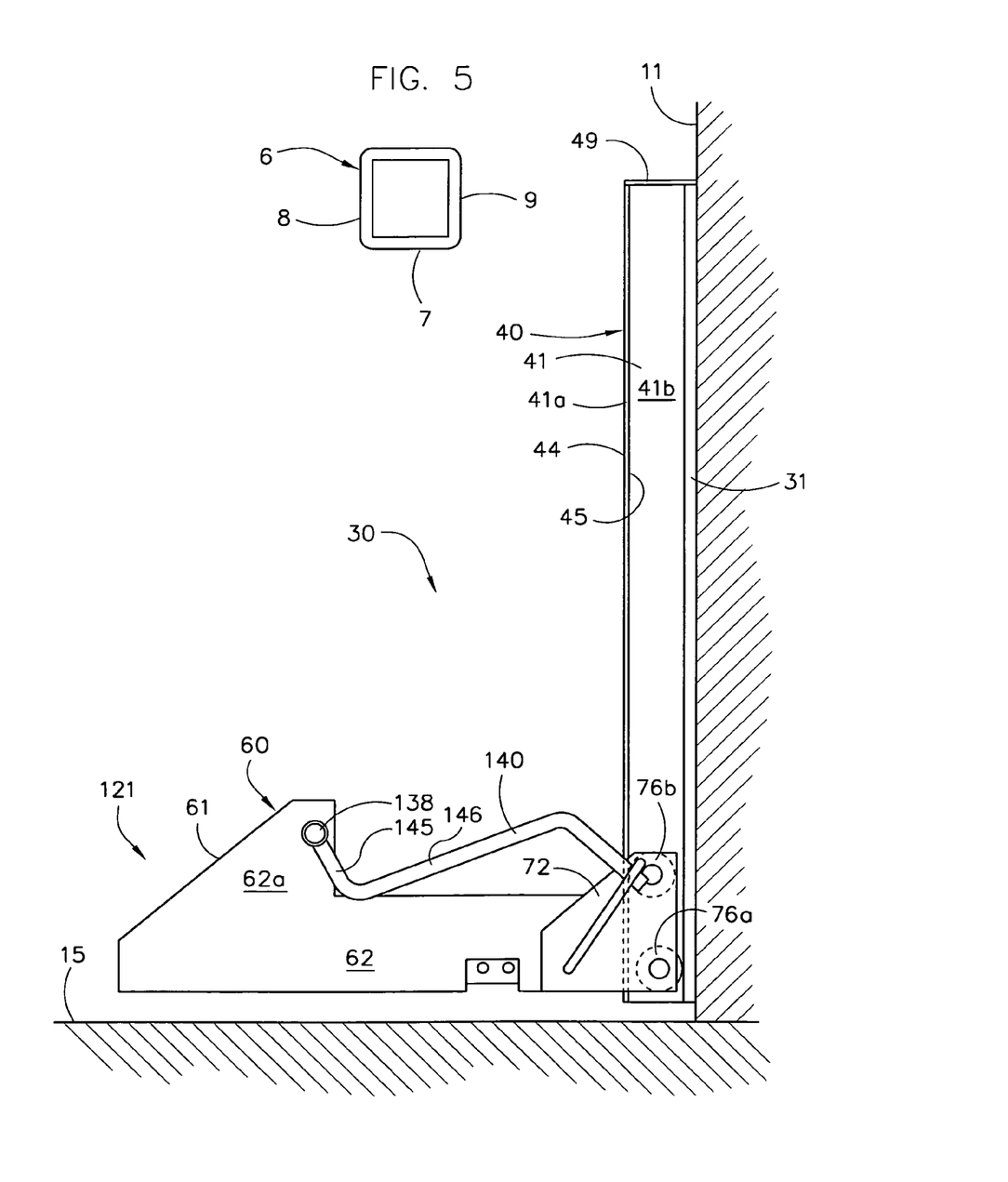
FIG. 5 is a side sectional of FIG. 3 showing the vehicle restraint in its stored position, and the barrier clearing the ICC bar of the trailer.

A dual function barrier assembly 60 is slidingly mounted to the track as shown in FIGS. 4 and 5. The barrier assembly 60 is structured and shaped to receive and restrain the ICC bar and carry and transmit the pullout load to the track 40 and mounting plate 31. The barrier assembly 60 also serves as a housing to protect various internal components. The barrier assembly 60 extends horizontally from the vertical track 40. The barrier assembly 60 includes a barrier or cover 61 formed by two hook shaped arms 62 that are spaced apart to form its side walls. Each arm 62 has an upwardly projecting hook 62a that has a height of about nine inches. The barrier 61 is also formed by a continuous web or cap 63. The upper and forward edges of each side wall 62 are welded or otherwise rigidly joined the cap or web 63 to produce a structurally strong and light weight shell construction. The restraining arms 62 and web or cap 63 are made of steel. Each arm 62 has a thickness of about ½ inch. The cap 63 has a thickness of about ¼ inch. As noted above, the barrier assembly 60 can withstand a horizontal pullout load of about 32,000 pounds, and weighs about 50 pounds.

Figure 9:
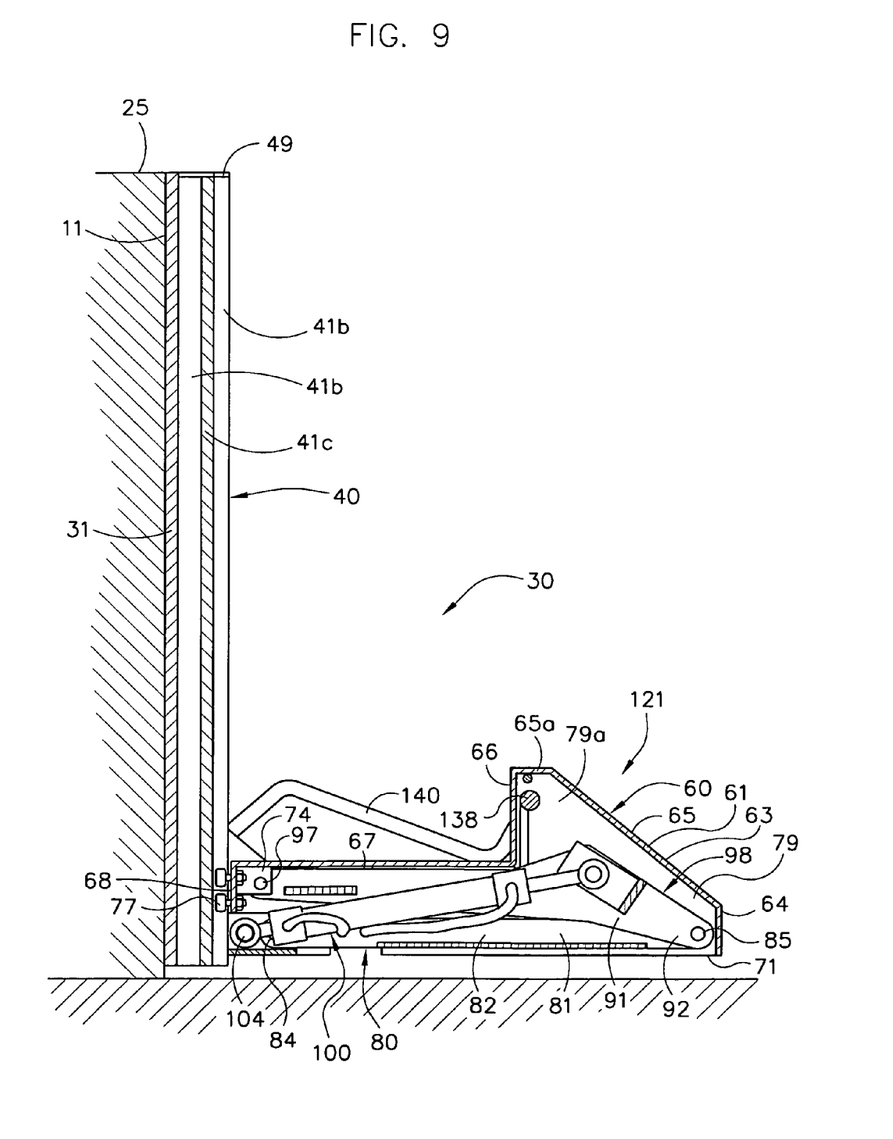
FIG. 9 is a side sectional view of FIG. 7 taken along line 9-9 showing the barrier and lift assemblies in their stored position and its sensor biased to its closed position.
Figure 11:
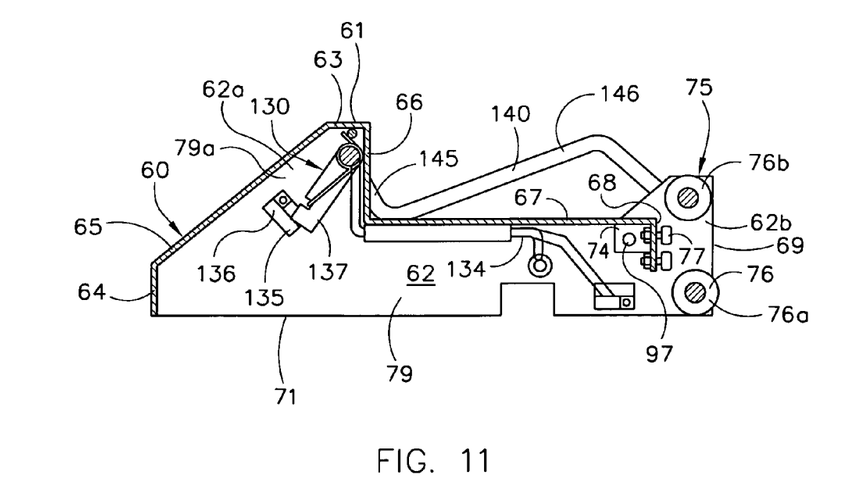
FIG. 11 is a side sectional view of FIG. 10 taken along line 11-11 showing the sensor contact and rotatable trigger rod biased into their closed position.

The web 63 of the barrier 61 forms a front wall 64, a sloped forward wall 65, an upper wall 65a, a rear facing abutment wall 66, a horizontal recessed wall 67 with a rear edge 67a, and a rear wall 68 as best shown in FIGS. 8, 9 and 11. These walls 64-68 are integrally formed by the continuous web or cover 63. The recessed wall 67 has a height of about four inches. Vertical wall 68 extends down from the horizontal wall 67. The sides of the wall 68 are welded or otherwise rigidly secured to the arms 62. The vertical wall 68 is used to mount a set of guide or torque rollers, and provide structural strength to the barrier 61, particularly recess wall 67. As discussed below, two tabs or lift brackets 74 are welded to the underside of horizontal wall 67 and vertical wall 68. The web or cover 63 does not extend to the rear end 69 of the barrier assembly 60, as do the arms 62. This forms a rear opening 70 that receives the track 40. The opening 70 is formed by the rear edge 67a of the recess wall 67 and guide ior push plate 68, which is spaced from the rear end 69. The hooked arms 62 and 63 are spaced apart slightly more than the width of the track 40. The barrier 61 has a lower perimeter 71 formed by the lower edges of the arms 62, front wall 64 and guide plate 68 of the continuous web 63. Each arm 62 has a raised portion toward its rear end 69, which is shaped to flushly mate with a generally triangular shaped stiffening plate 72. Each plate 72 is flushly aligned with the rear end 69, top of the raised rear portion, and lower edge 71 of each arm 62.

Figure 10:
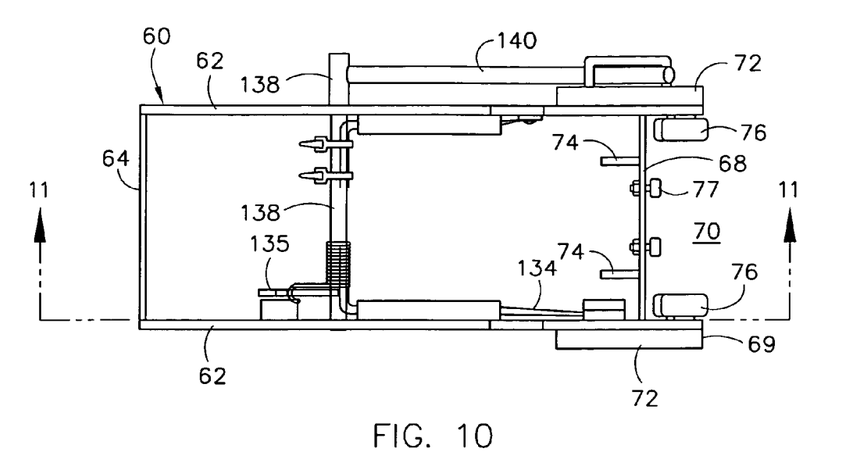
FIG. 10 is a bottom view of the barrier assembly.

The barrier assembly 60 has a guide assembly 75 as best shown in FIG. 10. The guide assembly 75 is located along the rear end 69 of the barrier assembly 60 to facilitate its sliding engagement with the track 40. The guide assembly 75 includes four main rollers 76. The main rollers 76 rotatably mounted to and extending inwardly from the arms 62 and stiffening plates 72 along their rear end 69. The guide assembly 75 also includes a set of four smaller thrust rollers 77. The thrust rollers 77 are rotatingly mounted to and extend rearwardly from the guide plate 68. These rollers 77 extend into the central recess of the track 40 near plate 41c, and engage its side walls 41b. Each roller 76 and 77 includes a conventional bushing (not shown). The guide assembly 75 and rollers 76 and 77 maintain the barrier assembly 60 in generally fixed horizontal alignment with the vertical track 40.

One set of two main rollers 76 is rotatably secured to the arm 60 and plate 72 on the right side of the barrier 61, and one set of two main rollers 76 is rotatably secured to the arm and plate on the left side of the barrier. Each roller 76 is located proximal the rear end 69 of the barrier 61. To prevent binding, each roller 76 has a diameter that is slightly less than the width of the slot formed between the tracks 42 or 43 and the mounting plate 31. One roller 76 in each set is located substantially directly above the other roller. The two lower rollers 76a are aligned so that their outer rolling surfaces engage the mounting plate 31 as shown in FIGS. 4 and 5. The two upper rollers 76b are offset a slight amount forward so that their outer rolling surfaces engage their respective track 42 or 43. During its vertical movement, the upper rollers 76b remain engaged with the rear surface 45 of the tracks 42 and 43, and the lower rollers 76a remain engaged with the front surface 32 of the mounting plate 31. The upper rollers 76b are located above the recess wall 67. The rollers 76b are in generally direct horizontal alignment with the region of the abutment wall 66 that will forceably engage the ICC bar 6 and retain the trailer 5 should a truck driver inadvertently attempt to pull the trailer away from the dock when it is being loaded or unloaded. The pullout load will pass through the barrier 61 and upper rollers 76a, and into the track 40.

The barrier 61 defines a throat or slot 78 formed by the vertical abutment wall 66 and the horizontal recess wall 67. The barrier 61 also forms a protected area 79 provided by its shell shaped construction and defined by its side arms 62 and continuous web 63. The protected area 79 is generally enclosed on four sides by the arms 62, front wall 64 and guide plate 68, and generally enclosed from above by the sloped wall 65, abutment wall 66 and recess wall 67. When the barrier 61 is in a stored position as discussed below, the protected area 79 is also generally enclosed from below by the ground 15. The protected area 79 houses a lift assembly and drive mechanism and sensor switch as discussed below. The protected area 79 includes an upwardly extending portion 79a formed by the hooks 62a of the arms 62 and the forward sloped wall 65 and the abutment wall 66 of the cover 63.

A lift assembly 80 assists in raising and lowering the barrier assembly 60 as best shown in FIGS. 4, 8 and 9. The lift assembly 80 is located below the barrier 61, and is preferably a two part lever formed by a lower tension assembly 81 and an upper triangular assembly 91. The tension assembly 81 has a generally planar shape and includes two spaced apart tension arms 82. The tension arms 82 are spaced apart a distance slightly less than the width of the barrier 61. Each tension arm 82 is an elongated steel bar or strip with opposed ends 83a and 83b. One end 83a of each tension arm 82 is pinned or otherwise rotatably joined to one of the vertical mounting flanges 54 or 55 of mounting bracket 51. One tension arm 82 is secured to vertical mounting flange 54, and the other arm 82 is secured to vertical mounting flange 55. The arms 82 remain in generally parallel and planar alignment, with the first ends 83a forming a first or lower pivot joint 84, and the upper ends 83b forming a second or central pivot joint 85.

The triangular push assembly 91 is formed by two vertically oriented, triangular shaped arms 92 with opposed ends 93a and 93b and a wider midsection or peak 94 as best shown in FIGS. 8 and 9. The triangular assembly 91 includes a horizontal push bracket 95 located proximal its midsection peak 94, and a spacing plate 96 located proximal its upper end 93b. The triangular assembly 91 is about four (4) inches wide or tall at its peak 94 where the push bracket 95 is mounted. The push plate 95 is mounted along an upper edge of the peak 94 and forms the highest portion of the lift assembly 80 when it is in its stored position. The peak 94 and push bracket 95 are located about half as far from its lower end 93a as its upper and 93b so that they are received within the elevated protected area 79a of the barrier 61 when it is in its stored position. The lower ends 93a of the side walls 92 of the push block 91 are pinned or otherwise rotatably joined to the upper ends 83b of the tension arms 81 at central pivot joint 85. The upper ends 93b of the side walls 92 of the push block 91 are pinned or otherwise rotatably joined to the tabs 74 of the guide or push plate 68 of barrier 61 at an upper pivot joint 97. The tabs 74 and upper pivot joint 97 are located near the recess wall 67 and track 40 so that the triangle arms 91 can be as long as possible and to reduce the loads on the rollers 76 when raising and lowering the barrier assembly 60. The tension assembly 81 and triangular assembly 91 each have a length of about 18 inches. The planar tension assembly 81 and triangular push assembly 91 form a pivoting linked connection between the barrier 60 and dock 20 via mounting plates 51 and 31.

Figure 6:
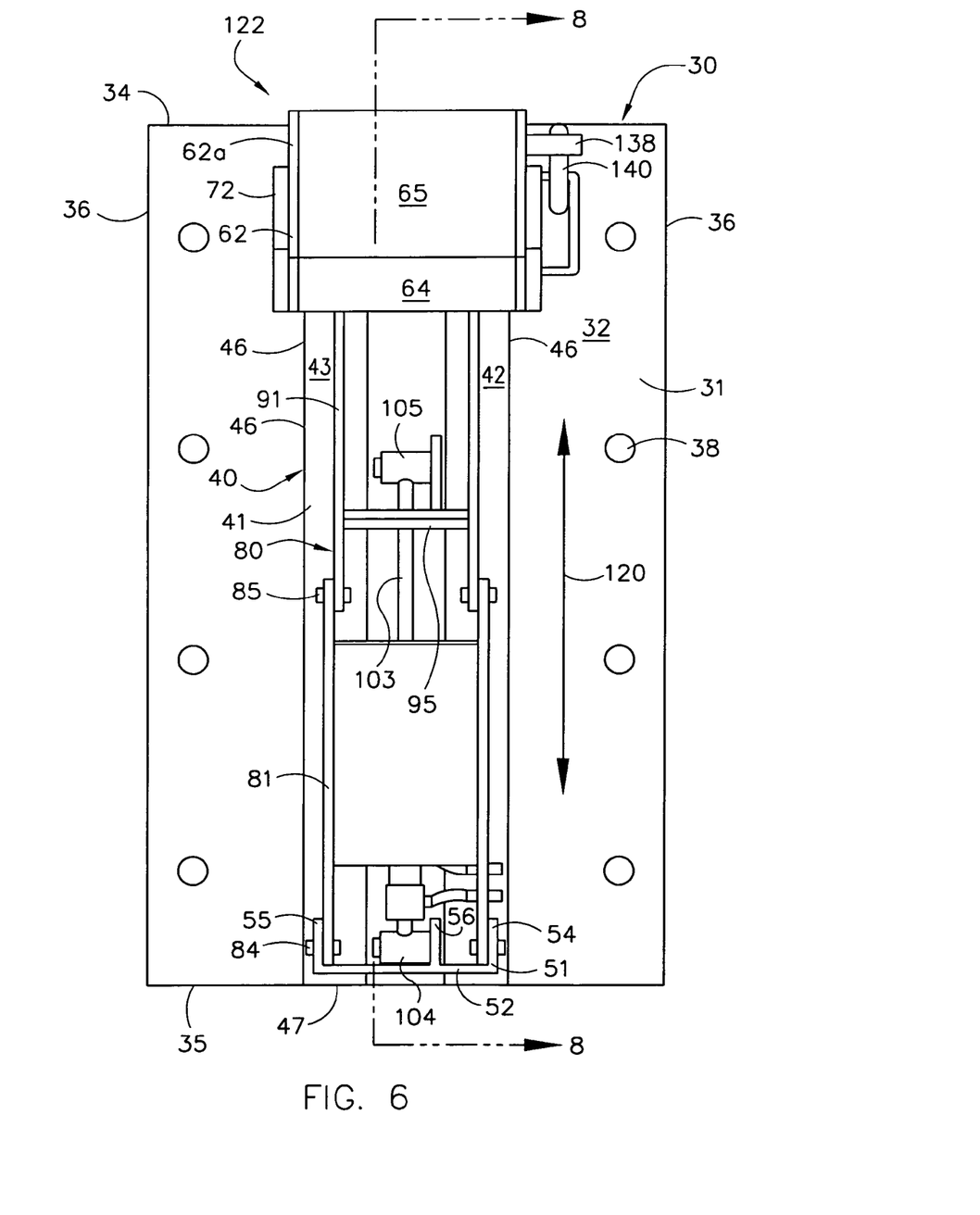
FIG. 6 is a front view of the vehicle restraint showing the lift assembly in its raise position.
Figure 7:
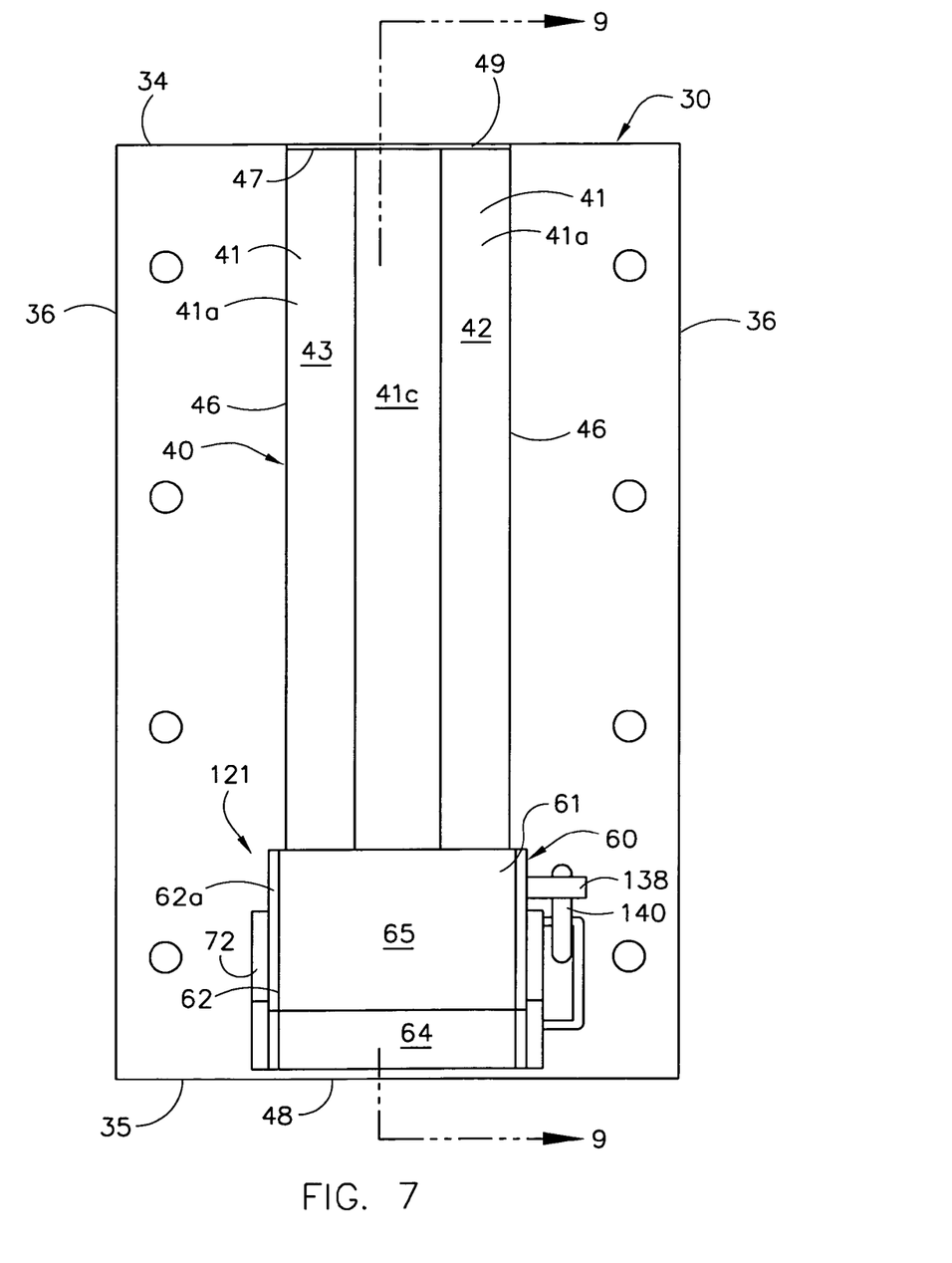
FIG. 7 is a front view of the vehicle restraint in its stored position.

The lift assembly 80 and its two-part lever 81 and 91 moves from a retracted position 98 (FIGS. 5, 7 and 9) to an extended position 99 (FIGS. 4, 6 and 8), as the barrier 60 moves between stored and raised positions 121 and 122, as discussed below. As best shown in FIG. 9, when the lift assembly 80 is in its retracted position 98, the individual arms 81 and 91 overlap in a generally nested arrangement where they form about an 8° angle. The tension arm 81 is substantially horizontal. The peak 94 and push bracket 95 of the triangular assembly 91 are elevated about three (3) inches above the lower pivot joint 84 of the tension arm 81. When retracted, the pivot joints 84, 85 and 97 are generally planar, with joint 97 being directly above joint 84. When in their fully extended position (FIGS. 8), the assemblies 81 and 91 extend into a more vertical alignment where they form about a 100° angle. The tension and push assemblies 81 and 91 are each about eighteen (18) inches in length, and pivot joints 84 and 97 remain in a substantially vertical planar alignment with each other, each being proximal the track 40 and rollers 76. Thus, the lift assembly 80 forms a generally isosceles triangle throughout its range of motion. The angle formed by the tension assembly 81 and the track 40 about pivot joint 84 is roughly equal to the angle formed by the triangle assembly 91 and the track 40 about pivot joint 97.

A drive unit 100 works in cooperation with the lift assembly 80 to raise and lower the barrier assembly 60. The drive unit 100 includes a drive mechanism 101, such as hydraulic cylinder that drivingly engages the lift assembly 80. The hydraulic drive unit 100 shown in FIG. 12 delivers hydraulic fluid to the hydraulic cylinder 101 to extend and retract the cylinder. The hydraulic cylinder 101 has a fixed portion 102 and a telescoping portion 103. The fixed portion 102 is pinned or otherwise rotatably joined to the central flange 56 of mounting plate 51. The telescoping portion 103 is pinned or otherwise rotatably joined to the mounting bracket 95 of triangular arm 91. The lower end of the fixed portion 102 provides a lower pivot joint 104, and the upper end of the telescoping portion 103 provides an upper pivot joint 105. The lower pivot joint 104 is in substantially horizontal alignment with pivot joint 84. Relative to the ground, the cylinder 101 moves between about a 10° angle when retracted (FIG. 9), and about a 60° angle when extended as in FIG. 8.

Figure 12:
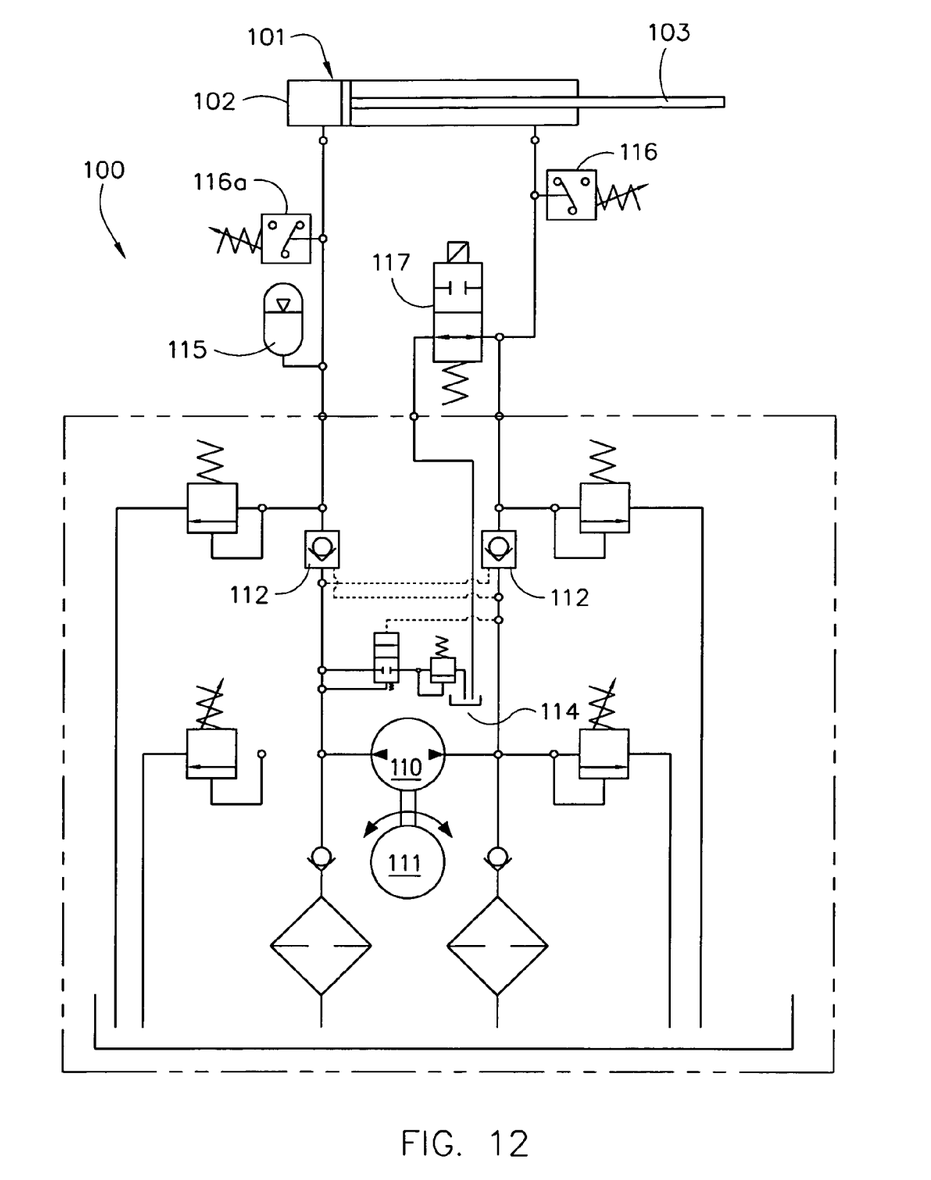
FIG. 12 is a schematic of the hydraulic power unit.

Hydraulic fluid is supplied to the cylinder 101 via hydraulic lines 107. The cylinder retracts to a length of 12 inches and extends to a length of 21 inches. The cylinder 101 has piston diameter of about one inch. The hydraulic cylinder 101 retracts to a length 12 inches, and extends to a length of about 21 inches. The cylinder is supplied with fluid at a pressure of about 800 to 1,000 psi. The hydraulic power unit 100 is preferably manufactured by Parker Hannifin as Part No. 108BEC 19CLB and sold under its OILDYNE mark. This drive unit 100 includes a pump 110 powered by a reversible DC electric motor 111, two check valves 112 and a fluid reservoir 114, as shown in FIG. 12. The drive unit 100 is modified to include an accumulator 115, two pressure sensor switches 116, and a solenoid dump valve 117. When the drive unit 100 is turned on, the pressure switches 116 are set to maintain the pressure in the cylinder 101 and accumulator 115 between 800 and 1,000 psi. When an operator turns on the drive unit 100 via the control panel, the pump motor 111 is activated. The pump motor 111 remains running until the fluid pressure reaches 1,000 psi. The pressure switch 116 then turns off the pump motor 111. While the drive unit 100 remains on, pressure switch 116a will turn on the pump motor 111 if the fluid pressure falls below 800 psi.

The drive cylinder 101 cooperates with the lift assembly 80 in a levered manner to raise the barrier assembly 60. The drive cylinder 101 has a maximum extension of only about 9 inches. The vertical stroke of drive cylinder 101 is even less, as its upper pivot joint 105 has a vertical stroke of only about 8 inches. Yet, the lift assembly 80 raises the barrier assembly 60 a vertical distance of about 21 inches. In other words, the upper pivot joint 97 of the lift assembly 80 has a vertical stroke of 21 inches when moved between its retracted and extended positions 98 and 99. As a result, the cooperating leveraged arrangement between the lift and drive assemblies 80 and 100 turns the 8 inch vertical stroke of the drive cylinder 101 into a 21 inch vertical stroke of the lift and barrier assemblies 60 and 80. Still, one of skill in the art should appreciate that the contemplated invention is not limited to these stroke lengths. Different overall configurations are possible, such as with a different lift assembly 80 geometry, or different pivot point 84, 85, 97, 104 and 105 locations.

The drive unit 100 can take the form of a gas spring that is structurally similar to the hydraulic cylinder 101. The gas spring has a fixed portion 102, a telescoping portion 103, and pivot joints 104 and 105. Similar to the hydraulic cylinder 101, the spring retracts to a length 12 inches, and extends to a length of about 21 inches. The spring is sized to produce an average force of about 1,700 Newtons. The gas spring or drive mechanism 101 is structurally interchangeable with the hydraulic cylinder 101 and is attached to the mounting channel 51 and lift assembly 80 the same way. A releasable latch (not shown) is provided to hold the drive mechanism or gas spring 101 and lift assembly 80 in their retracted position 98. When the dock worker releases the latch, the compressed gas in the spring 101 extends the telescoping end 103 to raise the barrier and lift assemblies 60 and 80. The dock worker resets the gas spring embodiment of the restraining device 30 by pushing the barrier assembly 60 down against the force of the gas spring until it reaches its stored position, where the latch locks it in place.

The barrier assembly 60 moves along a vertical path of travel 120 defined by the track 40. The barrier assembly 60 and its barrier housing 61 move between a lower stored position 121 and a raised operational position 122. The lift assembly 80 and drive unit 100 combine to produce a vertical lift or range of motion for the barrier 60 of about 21 inches. The lower limit of motion of the barrier 60 is defined by the engagement of the bottom edge of the vertical wall 68 of barrier 61 with the top edge of mounting bracket 51. The upper limit of motion of the barrier assembly 60 is defined by the maximum extension of the hydraulic or gas cylinder 101, or the physical contact between two desired components such as engagement between the upper rollers 76b and the cap 49 of the track 40.

A sensor assembly 130 is provided to indicate that the barrier assembly 60 is in restraining alignment with the ICC bar 6 of the trailer 5. As best shown in FIG. 11, a sensor or sensing circuit 123 is provided in the protected area 79 of the barrier 61. Wiring connects the sensing circuit to a sensor switch 135 in the protected area 79. The switch 135 has a fixed portion 136 secured to the barrier 61, and a rotatable portion 137 rotatably aligned to the fixed portion. The rotatable portion 137 is secured to and moves in unison with a rotatable bar 138. The ends of the bar 138 are rotatably joined to the upper hook portion 62a of the side arms 62. The bar 138 is bent rearwardly to form a trip rod 140. The rotation bar 138 and trip rod 140 are biased by a spring into an elevated position 141 where the fixed portion 136 of the contact 135 engages the rotatable portion 137 to complete the sensing circuit 122.

The rotatable bar 138 allows the trip rod 140 to rotate down when engaged by the ICC bar 6, so that the fixed portion 136 of the contact 135 separates from the rotatable portion 137 to break the sensing circuit 132. The trip rod 140 includes a shorter downward and rearward sloping section 145 and a longer upward and rearward sloping section 146. When biased into the normal position 141, the shorter downward sloping section 145 extends out beyond the rear facing vertical wall 66 of the barrier 60 and into the throat 78 as viewed from the side. The longer upward sloping section 146 extends above the horizontal recessed portion 67 of the barrier 60 and into the throat 78. As the barrier 61 is being raised by the drive unit 100 and the ICC bar 6 begins to enter the throat 78, the ICC bar engages and forceably rotates the trip rod 140 into an engagement sensing position 142. This tripping rotation of the trip rod 140 cause the portions 136 and 137 of the contact 135 to separate or break apart, which sends an engagement signal to the control panel 150.

Operation of Hydraulically Powered Vehicle Restraint

Although the operation of the hydraulically powered embodiment of the vehicle restraint 30 should be apparent from the above description, the following is provided to assist the reader in more readily understanding one possible method of operating this device. When a vehicle trailer 5 is backed into the loading dock 10, the vehicle restraint 30 is in its stored position 121 as in FIG. 9. The sensor switch 135 is closed and the trip rod 140 extends along the throat 78 of the barrier 61. When the trailer 5 is safely in the dock 10 with its ICC bar 6 engaging or sufficiently close to the face wall 11 or bumpers 12 of the dock as in FIGS. 3 and 5, the hydraulic unit 100 embodiment of the vehicle restraint 30 is turned on. This activates the pump motor 111 and the sensor 130. The pump 110 and motor 111 provide hydraulic fluid and pressure to the cylinder 101 via lines 107. The hydraulic fluid enters the cylinder 101 with enough pressure to cause its telescoping portion 103 to extend. The extension of the cylinder 101 pushes against the lift arm 91, which causes it to rise due to its pinned connection to the tension assembly 81 and barrier 61, both of which are fixed to the track 40 and open in a scissor-like manner by rotating in opposite directions.

When the barrier 60 has been raised to its operating position 122, the ICC bar 6 enters the throat 78 of the barrier 60, pushes the trip rod 140 down and its recess wall 67 engages the bottom 7 of the bar as in FIGS. 2 and 4. The downward rotation of the trip rod 140 breaks the sensor contact 135, which sends an engagement signal to the control panel 150. With the barrier 60 now engaging the ICC bar 6, the hydraulic fluid pressure in the cylinder 101 and accumulator 115 continues to increases via the pump motor 111. When the fluid pressure reaches a desired upper level or set point, such as 1,000 psi, the pressure switch 116 turns off the pump motor 111. The check valve 112 keeps the pressurized fluid in the cylinder 101 and accumulator 115, and keeps the barrier 60 forcibly engaged in the throat 78 of the ICC bar 6. When in this operating position 122, the rear facing vertical wall 66 of the barrier 60 forms a barrier or abutment that prevents the ICC bar 6 and trailer 5 from moving away from the front face 11 of the dock 10.

The hydraulic drive unit 100 automatically maintains the barrier assembly 60 in restraining alignment with the ICC bar 6 during loading and unloading of the trailer 5. When the trailer is being loaded and the ICC bar 6 starts to push down on the barrier 60, the pressure inside the cylinder 101 and accumulator 115 will increase. The dump valve 117 is open to allow extending of the cylinder 101 both when the unit 100 is being powered by the pump 110 or supplied by the accumulator 115. The dump valve 117 is only closed to allow powered lowering of the barrier 61. The flow of fluid out of the cylinder 101 allows the barrier 60 and lift assembly 80 to drop with the trailer 5 and ICC bar 6. When the trailer 5 is being unloaded and the ICC bar 6 begins to rise, the 1,000 psi fluid pressure in the accumulator 115 will automatically push more fluid into cylinder 101, which further extends the cylinder and raises the barrier 60 so that it remains in forced engagement with the ICC bar 6. If the fluid pressure drops below the desired lower level of 800 psi, then the pressure switch 116 reactivate the pump motor 111 until the pressure again reaches 1,000 psi.

When the trailer 5 is fully loaded or unloaded, and is ready for transport away from the dock 10, the operator uses the controls to power down the drive unit 100. This reverses the pump motor 111, which then pumps fluid out of one side of the cylinder and into the other. When the barrier assembly 60 returns to its stored position 121 as in FIG. 3, a second sensor or switch (not shown) is tripped, which sends a signal to the control panel 150 to indicate this to the operator. The ICC bar 6 is now below the top of the raised hook 62a of the barrier 61 and no longer within its throat 78. The trailer 5 can now be hauled away a truck. When in its stored position 121, the barrier 61 forms a housing or cover that protects its internal components, such as the lift assembly 80, cylinder 101, and sensor switch 132. The vehicle restraint 30 remains in its protected stored position 121 and ready for further use.

While this invention is susceptible to embodiments in many different forms, the drawings show and the specification describes two preferred embodiments of the invention. It should be understood that the drawings and specification are to be considered an exemplification of the principles of the invention. They are not intended to limit the broad aspects of the invention to the embodiments illustrated. Various changes may be made and equivalents may be substituted without departing from the broader aspects of the invention. Moreover, although the method of operating the hydraulic vehicle restraint 30 has been discussed, the broad aspects of the vehicle restraint are not limited to this method. Those of skill in the art should understand that the vehicle restraint can be controlled using various methods of operation. For, example, the hydraulic drive unit 100 can pull the barrier 60 down, or the barrier can be allowed to drop down under the force of gravity by simply turning the unit off.

I claim:

1. A loading dock vehicle restraint for securing a trailer to a loading dock, the loading dock having a face wall and an elevated floor, the floor being elevated from the ground in front of the face wall, the ground supporting the trailer, and the trailer having an ICC bar, said loading dock vehicle restraint comprising:

a track extending from a location proximal the ground to a location below the elevated floor of the dock, said track being anchored in place proximal the face wall;

a barrier assembly including a barrier and a guide, said barrier having front and rear ends, said barrier having a hook and a recessed portion that form a throat to receive the ICC bar and a rearward facing abutment to engage the ICC bar, said recessed portion and throat extending rearwardly from said abutment, said guide being located proximal said rear end of said barrier assembly and slidingly joining said barrier to said track to allow said barrier to move along a path of travel between stored and raised operating positions, said barrier extending from said track in a substantially fixed horizontal orientation as it moves along said path of travel;

a drive unit including a drive mechanism having first and second ends and being positioned below said barrier and movable between retracted and extended positions, said drive unit being selectively activated to move said barrier from said stored position to said raised operating position;

a lift assembly including a lower tension arm secured proximal said track at a fixed pivot joint, said lower tension arm being foldably joined to an upper push arm at a rotating pivot joint, said upper push arm having an upwardly offset peak, said arms being positioned below said barrier with said upper push arm being joined to said barrier assembly, said arms being movable between retracted and extended positions, said first end of said drive mechanism being pivotally secured near said fixed pivot joint of said lower tension arm, said second end of said drive mechanism being pivotally secured to said peak of said upper push arm, and said drive mechanism being joined to said offset peak of said upper push arm in a levered manner to selectively move said barrier from said stored position to said raised operating position; and, wherein said drive unit and lift assembly are configured to apply a substantially uniform upward lifting force to said barrier assembly when raising said barrier from said stored position to said raised operating position, and said barrier assembly is constructed to allow the ICC bar to move over it in an unobstructed manner when in said stored position.

2. The loading dock vehicle restraint of claim 1, and wherein said drive mechanism is an extendable cylinder that combines with said lift assembly to produce said substantially uniform upward lifting force between the range of about 160 to 200 pounds.

3. The loading dock vehicle restraint of claim 2, and wherein said extendable cylinder combines with said lift assembly to produce said substantially uniform upward lifting force of about 180 pounds.

4. The loading dock vehicle restraint of claim 2, and wherein said drive unit is electrically powered and said extendable cylinder including a working fluid, and said drive unit further includes a pump in fluid pumping communication with said extendable cylinder, an electric pump motor in driving communication with said pump, an accumulator in fluid communication with said extendable cylinder, and a pressure sensor in pressure sensing communication with said fluid in said extendable cylinder.

5. The loading dock vehicle restraint of claim 4, and wherein said extendable cylinder is one of either a hydraulic cylinder and a pneumatic cylinder.

6. The loading dock vehicle restraint of claim 1, and wherein said drive unit is a gas spring.

7. The loading dock vehicle restraint of claim 6, and wherein said gas spring combines with said lift assembly to produce said substantially uniform upward lifting force between the range of about 45 to 55 pounds.

8. The loading dock vehicle restraint of claim 6, and wherein said gas spring combines with said lift assembly to produce said substantially uniform upward lifting force of about 50 pounds.

9. The loading dock vehicle restraint of claim 1, and further including a sensor assembly having a sensing switch and a sensing mechanism, said sensing switch being movable between open and closed positions, said sensing mechanism including a trip rod extending outwardly from a side of said barrier with a portion extending rearwardly along side said throat of said barrier, said sensor assembly being constructed to sense when the ICC bar is sufficiently within said throat of said barrier.

10. The loading dock vehicle restraint of claim 9, and wherein said trip rod is upwardly biased to extend along said throat of said barrier, and said trip rod is downwardly movable when engaged by the ICC bar.

11. The loading dock vehicle restraint of claim 10, and wherein said sensor assembly is adapted to send a warning signal when said barrier assembly moves from said stored position and said sensor assembly fails to sense that said ICC bar is received within said throat of said barrier.

12. The loading dock vehicle restraint of claim 10, and wherein said trip rod is angled upwardly as it extends back toward said rear end of said barrier assembly to provide a consistent amount of rotation of said trip rod when engaging the ICC bar.

13. The loading dock vehicle restraint of claim 1, and wherein the trailer moves vertically up when being unloaded and moves vertically down when being loaded, said vertical movement resulting in a vertical displacement of the ICC bar, and said lift assembly and drive unit are constructed to bias said barrier to follow said vertical displacement of the ICC bar.

14. The loading dock vehicle restraint of claim 1, and wherein said barrier forms a shell that defines a protected compartment, and said lift assembly and drive mechanism are housed within said protected compartment when said barrier assembly is in said stored position.

15. The loading dock vehicle restraint of claim 14, and wherein said hook has a top located about 9 inches or less from the ground when said barrier assembly is in said stored position.

16. The loading dock vehicle restraint of claim 14, and said upper push arm is a triangular arm having a triangular shaped portion forming said peak with an upper end, and said second end of said drive mechanism is pivotally joined to said upper end of said triangular shaped portion, and said protected compartment has an upper cavity, and said triangular shaped portion of said triangular arm fits in said upper cavity when in said stored position.

17. The loading dock vehicle restraint of claim 16, and wherein said barrier has a sloped forward wall that forms said upper cavity, and said drive mechanism extends upwardly at an angle of about 10 degrees when in said stored position.

18. The loading dock vehicle restraint of claim 16, and wherein said guide is located along a rear end of said barrier and includes rollers that rollingly engage said track.

19. The loading dock vehicle restraint of claim 1, and wherein said lift assembly has a vertical stroke length, and said drive unit has a corresponding vertical stroke length, and said vertical stroke length of said lift assembly is greater than said corresponding vertical stroke length of said drive unit.

20. The loading dock vehicle restraint of claim 19, and wherein said lift assembly and barrier assembly have a vertical stroke length of at least about 21 inches when moving between said stored position and a maximum raised operating position.

21. The loading dock vehicle restraint of claim 19, and wherein said lower tension and upper push arms of said lift assembly each have upper and lower ends, said lower end of said lower tension arm being pivotally anchored, said upper end of said lower tension arm being pivotally joined to said lower end of said upper push arm, and said upper end of said upper push arm being pivotally joined to a guide plate of said barrier assembly.

22. The loading dock vehicle restraint of claim 1, and wherein said track is located in front of and is anchored to the face wall of the loading dock, the face wall being substantially vertical, and said track being substantially parallel to the face wall.

23. The loading dock vehicle restraint of claim 22, and wherein said track extends outwardly from the face wall of the dock and said barrier has a rear opening that receives said track.

24. The loading dock vehicle restraint of claim 23, and wherein said track is rigidly secured to a mounting plate, and said mounting plate is anchored to the face wall of the dock.

25. The loading dock vehicle restraint of claim 1, and wherein the ICC bar has a cross-sectional shape that is substantially rectangular or square with a vertical front wall and a horizontal bottom wall, said rearward facing abutment of said hook is substantially vertical and said recess portion forming said throat is substantially horizontal, said rearward facing abutment of said barrier being aligned for flush engagement with the front wall of the ICC bar when said barrier is in its said raised operating position.

* * * * *